J. H. ENGLEMAN.
MACHINE FOR MANUFACTURING LACQUERED WARE.
APPLICATION FILED SEPT. 1, 1910.
990,644.
Patented Apr. 25, 1911.
4 SHEETS—SHEET 1.
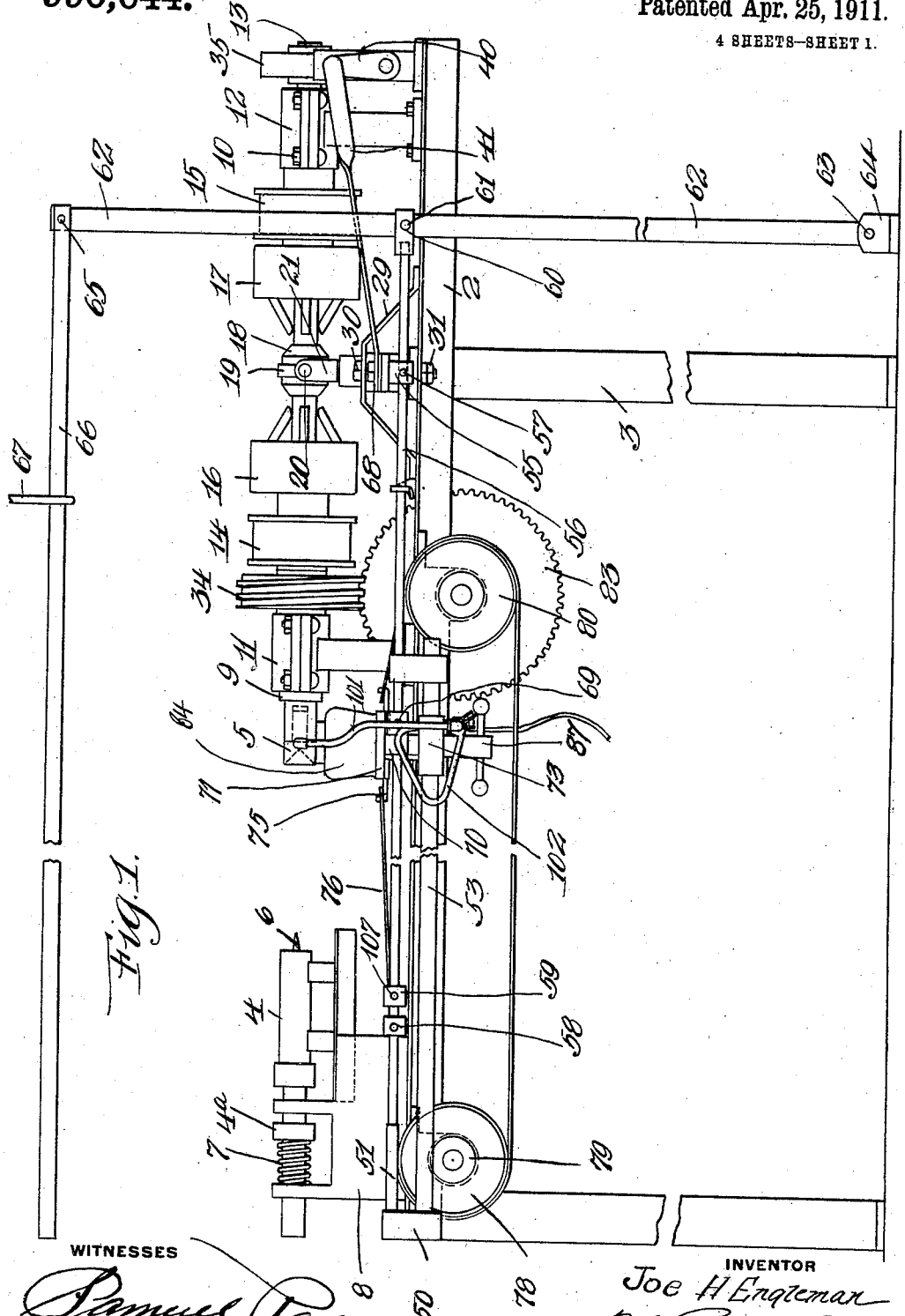
WITNESSES
INVENTOR
Joe H Engleman
by
Attorneys.

J. H. ENGLEMAN.
MACHINE FOR MANUFACTURING LACQUERED WARE.
APPLICATION FILED SEPT. 1, 1910.
990,644.
Patented Apr. 25, 1911.
4 SHEETS—SHEET 2.
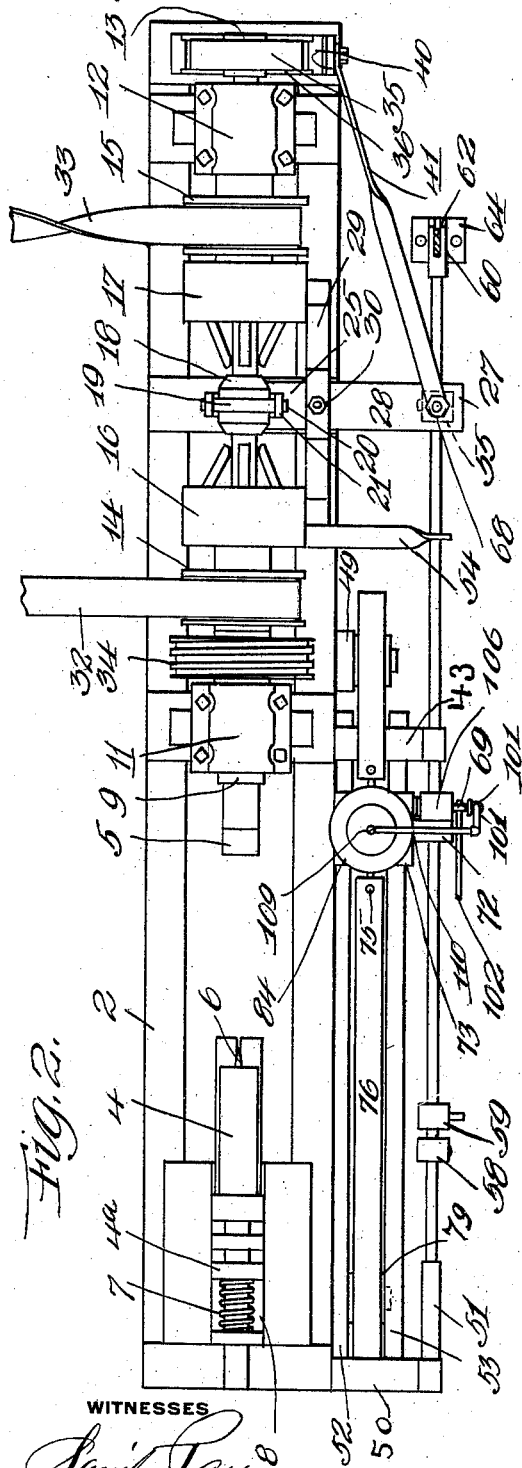
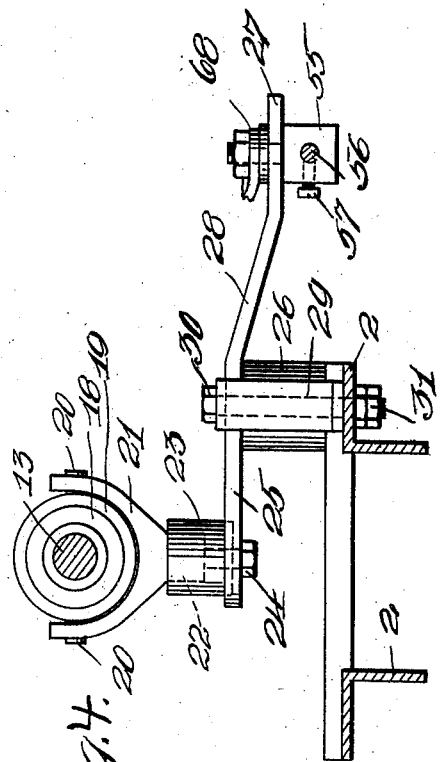
WITNESSES
INVENTOR
Joe H. Engleman

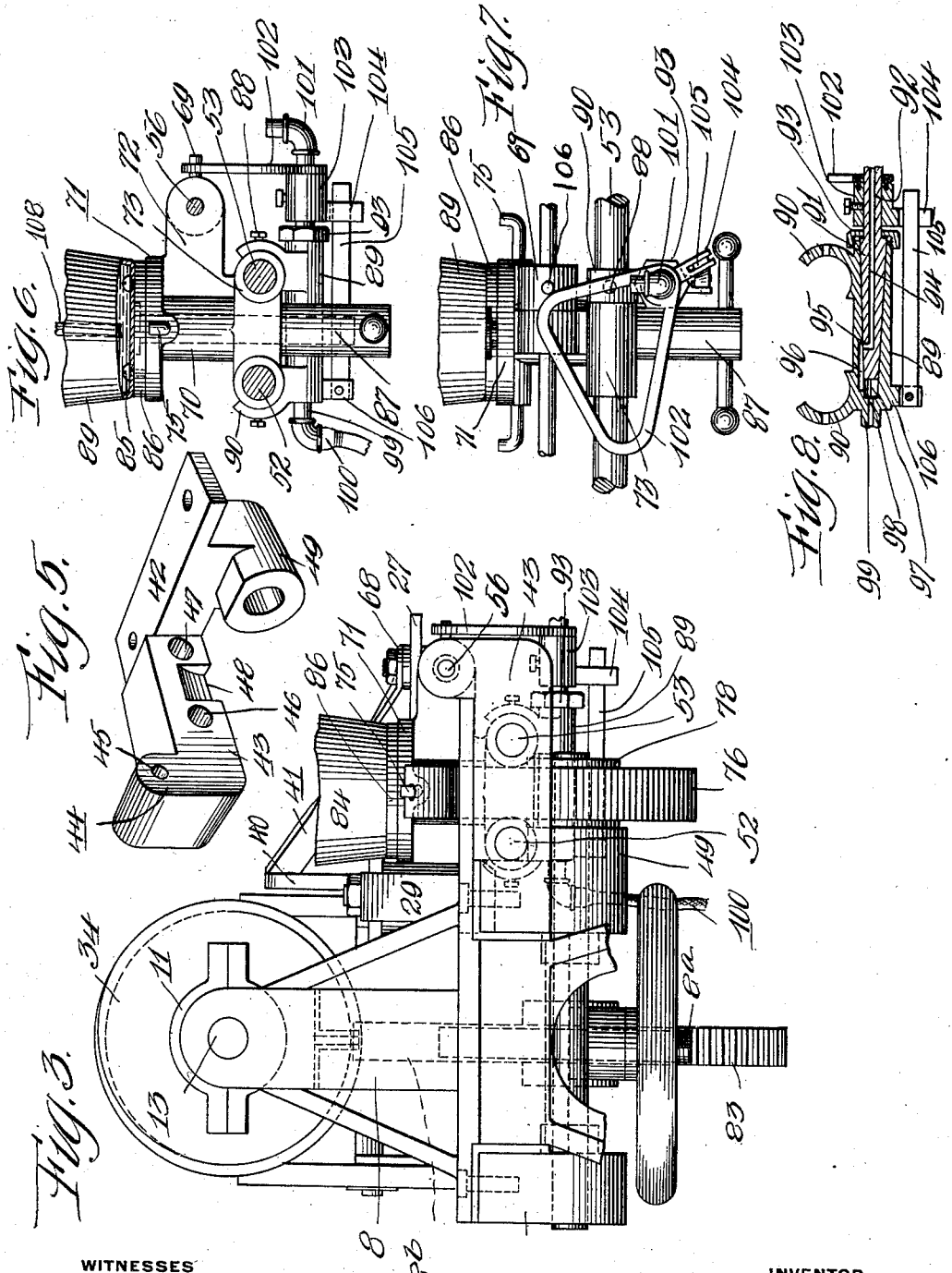

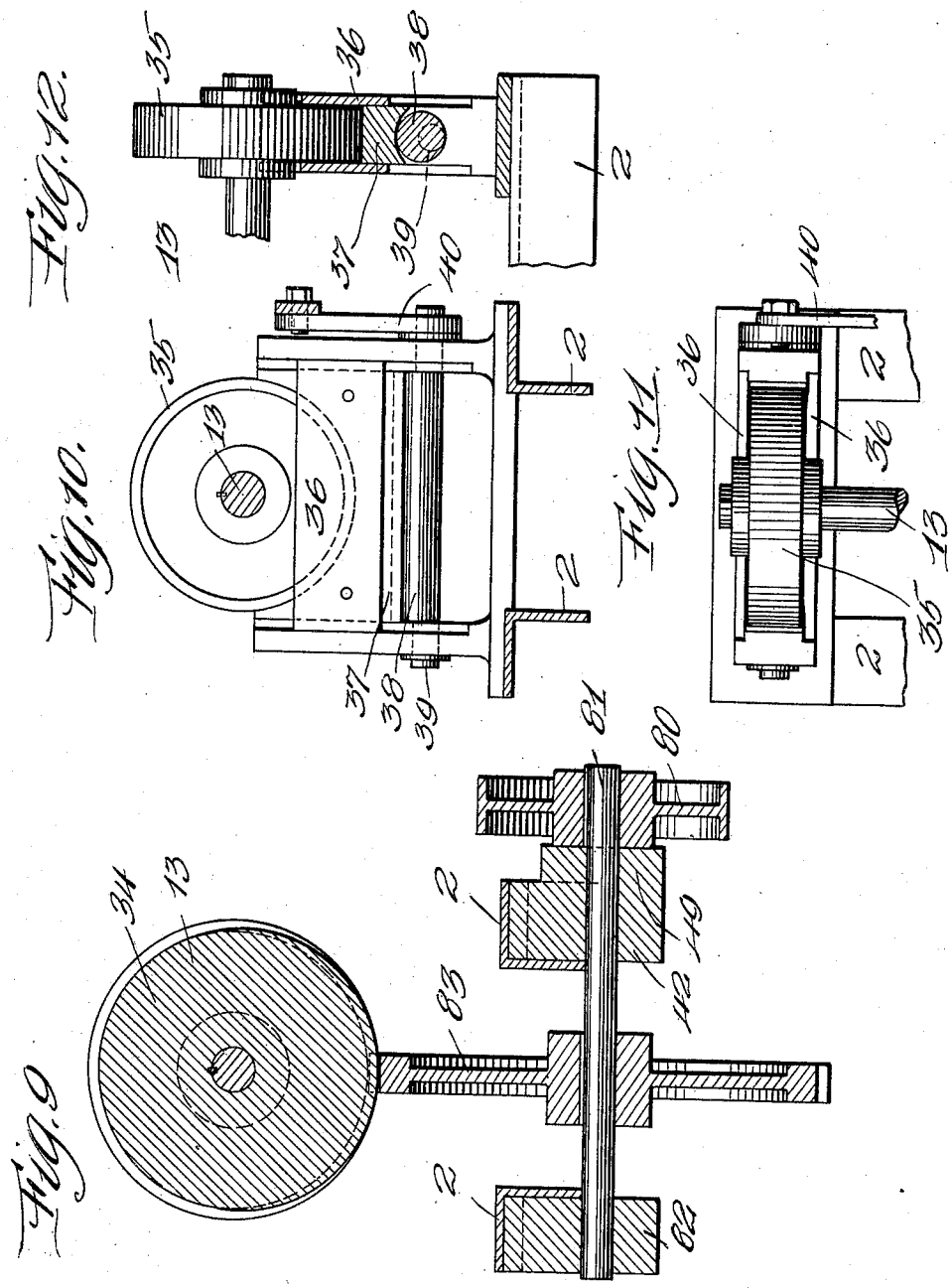

UNITED STATES PATENT OFFICE.

JOE H. ENGLEMAN, OF PITTSBURG, PENNSYLVANIA.

MACHINE FOR MANUFACTURING LACQUERED WARE.

990,644. Specification of Letters Patent. Patented Apr. 25, 1911.

Application filed September 1, 1910. Serial No. 579,979.

*To all whom it may concern:*

Be it known that I, JOE H. ENGLEMAN, a citizen of the United States of America, residing at Pittsburg, in the county of Allegheny and State of Pennsylvania, have invented certain new and useful Improvements in Machines for Manufacturing Lacquered Ware, of which the following is a specification, reference being had therein to the accompanying drawing.

This invention relates to machines for manufacturing lacquered ware, and has for its object to provide a machine of such class in a manner as hereinafter set forth whereby the work to be operated upon will be automatically, evenly and quickly coated with lacquer from end to end while revolving.

A further object of the invention is to provide a lacquering machine with a longitudinally traveling lacquer reservoir moving in operative relation with respect to the work operated upon and from which the lacquer is forced upon the work during the revolving of the work and travel of the reservoir whereby the lacquer will be supplied to the work from end to end thereof.

A further object of the invention is to provide a lacquering machine with a traveling lacquer reservoir from which the lacquer is supplied to the work, the work revolving during the application of the lacquer, and to further provide means for automatically discontinuing the revolving of the work when the traveling lacquer reservoir has reached the limit of its movement in one direction and further to automatically brake the work holder to prevent any rotation thereof after the reservoir has reached the limit of its movement in one direction.

Further objects of the invention are to provide a lacquering machine which is comparatively simple in its construction and arrangement, strong, durable, efficient in its use, conveniently operated, and comparatively inexpensive to manufacture.

With the foregoing and other objects in view, the invention consists of the novel construction, combination and arrangement of parts as hereinafter more specifically described and illustrated in the accompanying drawings, wherein is shown a preferred embodiment of the invention, but it is to be understood that changes, variations and modifications can be resorted to which come within the scope of the claims hereunto appended.

In describing the invention in detail, reference is had to the accompanying drawings, wherein like reference characters denote corresponding parts throughout the several views, and in which:—

Figure 1 is a front elevation of a lacquering machine in accordance with this invention. Fig. 2 is a top plan. Fig. 3 is an end view. Fig. 4 a sectional detail illustrating the actuating means for the clutches. Fig. 5 is a view of the supporting bracket. Fig. 6 is an end elevation partly in section of the lacquer reservoir and the valve mechanism for controlling the supply for discharging the lacquer from the reservoir. Fig. 7 is an end elevation looking to the rear. Fig. 8 is a longitudinal sectional view of the air controlling valve. Fig. 9 is a sectional elevation of the means for shifting the lacquer reservoir. Fig. 10 is an end view, Fig. 11 a plan and Fig. 12 a sectional elevation of the brake.

Referring to the drawings in detail, 2 denotes a rectangular supporting frame mounted upon uprights 3. Upon the frame 2 is positioned a work holder comprising a longitudinally shiftable spring-controlled holding arm 4 and a rotatable holding arm 5. The work is held between the arms 4, 5 and rotated by the arm 5, the arm 4 having a bearing 6, upon which, the work when revolved by the arm 5 rests. The work holder further includes a longitudinally adjustable support 8 which is detachably secured to the frame 2 by an adjusting screw 8$^a$ engaging in a threaded pocket 8$^b$ formed in the support 8. The support 8 is connected to one end of the frame 2 and has shiftably mounted therein the arm 4 provided with a collar 4$^a$ and surrounded by a spring 7, the function of the latter being to project the arm 4 toward the arm 5. To the top of the frame 2 is secured a pair of uprights 9 and 10, the former arranged approximately centrally of the frame and the latter in close proximity to that end opposite the end to which the support 8 is attached. Carried with the uprights 9 and 10 are bearings 11 and 12 respectively in which is mounted a longitudinally extending operating shaft 13 having one end attached to the arm 5 and constituting means for rotating the said arm in either direction when occasion so requires. Loosely mounted upon the shaft 13 is a pair of pulleys 14, 15 capable of being alternately clutched thereto by the clutches 16 and 17 which are interposed between the pulleys 14, 15. The clutch 16 is used in connection with the pulley 14 and the clutch 17 in connection with the pulley 15. The shaft 13 is driven in one direction when the pulley 14 is clutched thereto and in the opposite direction when the pulley 15 is clutched thereto. Slidably mounted upon the shaft 13 and interposed between the pulleys 14 and 15 is a rotatable shiftable sleeve 18 for moving either one of the clutches to operative position so as to clutch its respective pulley to the shaft. Loosely seated in the outer face of the sleeve 18 is a collar 19 within which the sleeve 18 rotates. The collar 19 is formed with a pair of oppositely disposed lugs 20, loosely connected to a yoke 21 provided with a stem 22 which extends through an annular member 23 and is connected by the holdfast device 24 to a shifting lever 25 which is mounted upon a support 26 upon the frame 2 as well as projects outwardly from the frame 2 and has its outer end, as at 27 off-set with respect to its inner end and the end 27 is connected to the inner end of the lever by an inclined portion 28. The support 26 is connected to the frame 2 by a tie-bar 29 and extending through the support 26 and the tie-bar 29 is a headed bolt 30. The bolt 30 also extends below the frame 2 and is provided with a pair of nuts 31 for securing it in position. The pulley 14 is connected to a prime mover by a transmission belt 32 and the pulley 15 is also connected to the prime mover by a transmission belt 33, the latter being twisted so that the pulley 15 will revolve in an opposite direction with respect to the shaft 13 at a point intermediate the bearing 11 and the pulley 14 is a worm pinion 34, the function of which will be hereinafter referred to. The shaft 13 projects from the bearing 12 and carries on its projecting end a brake disk 35 which extends into a bracket 36 fixed to the frame 2 and is adapted to be engaged by a brake block 37 for arresting the movement of the shaft 13. The block 37 is operated by an eccentrically mounted roller 38 carried by a shaft 39 journaled in the bracket 36 as well as projecting from said bracket. The projecting end of the shaft 39 is provided with a crank 40 attached to an operating arm 41, the latter being actuated in a manner as hereinafter referred to.

Secured to the frame 2 centrally of one side is a supporting bracket 42 having a laterally extending arm 43 formed with a centrally disposed off-set 44 provided with an opening 45. The arm 43 is furthermore formed with a pair of openings 46, 47 and a groove 48. Formed integral with the bracket 42 is a bearing sleeve 49. Secured to one end of the frame 2 is a laterally extending supporting arm 50 provided with a right angularly disposed hollow sleeve 51.

Secured to the arm 50 are the ends of a pair of guide rods 52, 53, the other end of said rods extend through the openings 46, 47 of the arm 43. Loosely extending in the sleeve 51 and projecting through the opening 44 of the arm 43 and also extending through an outwardly-extending hanger 54, and also through a lug 55 depending from the outer end 27 of the lever 25 is an actuating bar 56 for said lever 25. The bar 56 is fixedly secured to the lug 55 by a hold-fast device 57 and is provided with a pair of adjustable stops 58, 59. The bar 56 is secured to a coupling member 60 pivotally connected, as at 61 to a vertically disposed lever 62, the latter being pivotally connected at its lower end, as at 63 to a bracket 64 and at its upper end pivotally connected, as at 65 to an actuating member 66, the latter being supported in a hanger 67 and is adapted when moved inwardly to shift the lever 62 rearwardly, the latter carrying the rod 56 therewith and actuating the lever 25 so as to move the sleeve 18 forwardly, the latter shifting the clutch 16 to engagement with the pulley 14 so as to clutch the pulley 14 to the shaft 13. If the member 66 is moved forwardly, the lever 62 is carried therewith, the latter moving the rod 56 so as to shift the lever 25 in the opposite direction than that as stated, thereby moving the collar 18 rearwardly and operating the clutch 17 to couple the pulley 15 to the shaft 13 whereby the shaft will be rotated in a direction opposite to that in which it is rotated by the pulley 14. The operating arm 41 for the crank 40 is connected, as at 68 to the end 27 of the lever 25. The rod 56 is provided with an adjustable stop 69. When the parts are in position as shown in Fig. 3 of the drawings, both clutches are out and the brake is on, the lever 62 should be shifted toward the pulley 14 and the brake will be released when the pulley 15 couples with the shaft 13 to drive it. The stops 58, 59 are utilized for the purpose of carrying the rod 56 toward the support 8 so as to shift the lever 23 and uncouple the pulley 14 from the shaft 13 thereby discontinuing the operation of the shaft, and simultaneously with this uncoupling operation the arm 41 is shifted to bring the brake into operation so as to hold the shaft 13 fast. The block 69 is utilized for shifting the rod 56 in the opposite direction to uncouple the pulley 15 and also to operate the arm 41 in the opposite direction to brake the shaft when the pulley 15 is released. The manner in which the stops 58, 59 and 69 are used to shift the shaft 56 in one direction or the other will be presently referred to.

The machine comprises a carrier for shifting a lacquer reservoir and for furthermore shifting an air controlling valve mechanism so that the lacquer reservoir, carrier and air controlling valve mechanism will move as one. The carrier consists of a vertically disposed cylindrical member 70 provided with a supporting plate 71, a laterally extending arm 72 through which extends the rod 56, and a pair of laterally-extending lugs 73 which are loosely mounted upon the guide rods 52, 53. The supporting plate 71 has projecting therefrom a pair of oppositely disposed hooks 75. The carrier is reciprocated through the medium of a transmission belt 76 having one end connected to the hook 75 and its other end connected to the other hook 75. The belt 76 travels over a pulley 78 journaled in a bracket 79 at one end of the machine and also travels over a pulley 80 carried by a shaft 81 which is journaled in the sleeve 49 and also in a bearing 82 which is secured to the frame 2. The shaft 81 has fixed thereto a gear wheel 83 which is engaged and operated by the worm pinion 34. When the pinion 34 operates in one direction, the carrier will be shifted toward the support 8 and when the pinion operates in the opposite direction, the carrier will be shifted toward the upright 9.

The lacquer reservoir is indicated by the reference character 84 and is fixedly secured by the hold-fast device 85 to a bar 86 adjustably connected to the supporting plate 71 and cylindrical member 70 by an adjustable clamping device 87.

Secured to the lugs 73 by clamping screws 88 is an air controlling valve mechanism consisting of a valve casing 89 provided with a pair of curved flanges 90 which engage the lugs 73 and are secured thereto by the clamping screws 88. Within the casing 89 is a longitudinally extending valve plug 91 provided with a stem 92 which projects from one end of the casing. The plug 91 is shouldered and rotatably connected to the casing 89 by a flanged cap 93 which engages one shouldered portion of the plug. The plug 91 is provided with a longitudinally extending passage 94 and an inner port 95 which communicates with said passage 94, the latter extending through the stem 92. The inner port 95 is adapted to communicate with a recess 96 formed in the wall of the valve chamber 97 and when the plug 91 is shifted in one direction, communication is established between the inlet 98 of the valve chamber and the passage 94, whereby air entering the chamber 97 can pass through the plug and be utilized for supplying lacquer to the work in a manner to be presently referred to. Communicating with the inlet 98 is a nipple 99 to which an air supply pipe 100 is connected. Attached to the stem 92 is a conducting pipe 10, the function of which will be presently referred to. The valve plug 91 is automatically opened and closed by a triangularly shaped member 102 which is connected to the stem of the plug, as at 103 and formed with a bifurcated extension 104 through which extends a spring 105 carried by a lug 106 depending from the casing 89. The function of the spring 105 is to normally retain the valve plug shifted to a position whereby communication will be had between the port 95 and the recess 96 so that air can pass through the valve mechanism, that is so that air can pass from the pipe 100 to the pipe 101. The triangularly shaped member 102 is adapted to engage the lug 106 on the stop 69 and shift said member whereby the plug is moved to shut off communication between the port 95 and the recess 96. When the carrier moves in the opposite direction, the spring 105 will come into play and open the controlling valve mechanism. The member 102 is also operated by a lug 107 on the stop 59 so as to close the plug but when the carrier moves in the opposite direction, the spring 105 will come into play and open the plug. The pipe 100 leads to a suitable air supply (not shown).

Extending into the lacquer reservoir is a tube 108 which opens at the top of the reservoir, as at 109 and disposed at right angles with respect to the top of the tube 108 is a tube 110 with which the pipe 101 communicates. The tubes 108 and 100 are utilized for discharging the lacquer on the itemizing principle. The tube 110 is disposed at right angles with respect to the work so that when the reservoir travels and the air supply is open, the lacquer will be withdrawn from the reservoir and forced upon the work while the work is revolving.

It will be assumed that the elements of the machine are in the position shown in Fig. 1 of the drawings. The work is placed between the holding arms, the arm 4 being shifted to allow the mounting of the work. It will now be assumed that the member 66 is moved inwardly which shifts the lever 62 rearwardly carrying the rod 56 therewith and moving the lever 23 so as to slide the sleeve 18 and cause the clutch 16 to engage the pulley 14 and couple it to the shaft 13. This positioning of the parts revolves the operating shaft 13, and as the shaft revolves, the worm pinion engaging with the gear 34 will revolve the pulley 80 and shift the belt 76, as the belt 76 moves toward the arm 4, the reservoir 84 is carried therewith. As the compressed air supply has been opened, it is evident that the lacquer will be withdrawn from the reservoir and forced upon the work while the latter is revolving. When the carrier comes into contact with the stop 59 the lug 107 will engage the member 102 and close the plug against the action of the spring 105 and on a further movement of the carrier, the rod 56 will be shifted, uncoupling the pulley from the shaft 13 and throwing the brake into operation to retard movement of the shaft. The elements remain in such position until the work is removed and a new piece placed between the holding arms. The member 66 is then pulled outwardly whereby the clutch 77 engages the pulley 15 and connects it to the shaft 13, so as to rotate the shaft in the opposite direction, thereby causing the plate 76 to travel in the opposite direction and the moving of the reservoir toward the arm 5. As the reservoir travels toward the arm 5, it will conveniently engage the stop 69 and not only shift the rod 56 but also the member 66 and close the air supply. When the member 66 is shifted by the engagement of the carrier with the stop 69, the pulley 15 is uncoupled from the shaft and the brake thrown into operation.

What I claim is:

1. A lacquer applying machine comprising a work holder mechanism for rotatably supporting the work, means whereby the work can be revolved in either direction, a longitudinally movable lacquer applying mechanism traveling simultaneously with the rotation of the work, means whereby the traveling movement of the lacquer applying mechanism is arrested in either direction, and means for discontinuing the rotation of the work when the travel of the lacquer applying mechanism is arrested.

2. A lacquer applying machine comprising a work holder mechanism for rotatably supporting the work, means whereby the work can be revolved in either direction, a longitudinally movable lacquer reservoir, pneumatic means for discharging the lacquer from the reservoir on to the work while the reservoir is traveling and the work revolving, means for arresting the travel of the reservoir in either direction, means for discontinuing the operation of said pneumatic means when the travel of the reservoir is arrested, and means for simultaneously discontinuing the rotation of the work when the travel of the reservoir is arrested.

3. A lacquer applying machine comprising a work holder for rotatably supporting the work, means whereby the work is revolved in either direction, a shiftable lacquer reservoir, pneumatic means for supplying lacquer to said reservoir during the shifting thereof and during the revolving of the work, and means for automatically arresting the shifting movement of the reservoir and the rotation of the work.

4. A lacquer applying machine comprising a work holder for rotatably supporting the work, means whereby the work is revolved in either direction, a shiftable lacquer reservoir, pneumatic means for supplying lacquer from said reservoir during the shifting thereof and during the revolving of the work, means for automatically arresting the shifting movement of the reservoir and the rotation of the work, and means for automatically controlling the operation of said pneumatic means when the travel of the reservoir is arrested and when the reservoir is traveling.

5. A lacquer applying machine, comprising a work holder for rotatably supporting the work, means whereby the work can be revolved in either direction, a longitudinally shiftable lacquer reservoir arranged in operative relation with respect to the work, means for shifting said reservoir, means for supplying lacquer from said reservoir to the work during the travel of the reservoir, means for controlling said supply means, and means for arresting the travel of the reservoir in either direction.

6. A lacquer applying machine comprising a work holder, means for revolving the work mounted upon the holder, a longitudinally movable lacquer applying mechanism traveling at one side of said work holder and adapted during its travel to supply lacquer upon the work from end to end of the latter, means for controlling the supplied lacquer to the work, means for controlling the travel of said lacquer applying mixture, and means for simultaneously discontinuing the rotation of the work when the travel of the reservoir is arrested.

In testimony whereof I affix my signature in the presence of two witnesses.

JOE H. ENGLEMAN.

Witnesses:
C. T. Hood,
Eva A. Milne.

Copies of this patent may be obtained for five cents each, by addressing the "Commissioner of Patents. Washington, D. C."